United States Patent [19]
Miniscalco et al.

[11] Patent Number: 4,788,687
[45] Date of Patent: Nov. 29, 1988

[54] FLUOROZIRCONATE FIBER OPTIC LASER

[75] Inventors: William J. Miniscalco, Sudbury; Leonard J. Andrews, Wayland; Barbara A. Thompson, Bedford, all of Mass.

[73] Assignee: GTE Laboratories Incorporated, Waltham, Mass.

[21] Appl. No.: 133,865

[22] Filed: Dec. 16, 1987

[51] Int. Cl.$^4$ ............................................. H01S 3/17
[52] U.S. Cl. ..................................... 372/40; 372/39; 350/96.34; 252/301.17
[58] Field of Search ................ 372/41.39; 252/301.17; 65/3.11; 350/96.34

[56] References Cited

U.S. PATENT DOCUMENTS

| | | | |
|---|---|---|---|
| 4,336,047 | 6/1982 | Pavlopoulous et al. | 350/96.34 |
| 4,341,873 | 7/1982 | Robinson et al. | 350/96.34 |
| 4,666,486 | 5/1987 | Hutta | 65/3.11 |
| 4,680,044 | 7/1987 | Pastor | 65/3.11 |

OTHER PUBLICATIONS

P.B. Mauer, Laser Action in Neodymium-Doped Glass at 2.37 microns, Appl. Opt., vol. 3, No. 1, Jan. 1964, p. 153.
M. C. Brierley, P. W. France, Neodymium-Doped Fluoro-Zirconate Fiber Laser, Electronics Letters, vol. 23, No. 16, Jul. 30, 1977, pp. 815-817.
I. P. Alcock, A. I. Ferguson, D. C. Hanna, A. C. Tropper, Tunable, Continuous-Wave Neodymium-Doped Monomode-Fiber, Laser Operating at 0.900-0.945 & 1.070-1.135 $\mu$m Optics Letters, vol. 11, Nov. 1986, pp. 709-711.
H. Po, F. Hakimi, R. J. Mansfield, R. P. Tumminelli, B. C. McCollum, E. Snitzer, Neodymium Fiber Lasers at 0.905, 106, & 1.04 $\mu$m, Opt. Soc. of Amer. 1986 Ann. Mtg. p. 103.
R. J. Mears, L. Reekie, I. M. Jauncey, D. N. Payne, High-Gain Rare-Earth-Doped Fiber Amplifier at 1.54 $\mu$m, OFC/IOOC, Wed. Afternoon, 1987, p. 167.

*Primary Examiner*—Leon Scott, Jr.
*Attorney, Agent, or Firm*—Ivan L. Ericson

[57] ABSTRACT

A laser has been made using a $Nd^{3+}$-doped fluoro-zirconate heavy metal fluoride (HMF) glass multimode fiber which lases in a range equal to or greater than 1.32 micrometers. The fiber laser was made for forming a glass fiber from a core glass composition comprising 52.8 mole % $ZrF_4$, 19.9 mole % $BaF_2$, 2.5 mole % $LaF_3$, 3.0 mole % $AlF_3$, 19.9 mole % NaF, 0.4 mole % $InF_3$, and 1.5 mole % $NdF_3$ the active dopant and the composition of the cladding glass comprises 39.6 mole % $ZrF_4$, 17.9 mole % $BaF_2$, 4.0 mole % $LaF_3$, 3.0 mole % $AlF_3$, 21.9 mole % NaF, 0.4 mole % $InF_3$, and 13.2 mole % $HfF_4$.

16 Claims, 2 Drawing Sheets

FLUOROZIRCONATE FIBER OPTIC LASER

FIELD OF THE INVENTION

This invention relates to a laser. More particularly, this invention relates to a fluoride glass laser.

BACKGROUND OF THE INVENTION

Although the concept of a fiber optic laser is not new, early devices were multimode and synthesized from batch melted glasses which did not have the nearintrinsic loss or high bandwidth of current optical fiber. It has only been within the pass few years that high performance, single mode, fiber lasers and amplifiers have been demonstrated using telecommunicationsgrade silica fiber. Recently, this work has been extended to other glass systems and a $Nd^{3+}$-doped fluorozirconate heavy metal fluoride (HMF) glass multimode fiber laser has been demonstrated at 1.05 micrometers as discussed by M. C. Brierley and P. W. France, "Neodymium-doped fluoro-zirconate fiber laser," Electron, Lett. 23, 815 (1987). However, all these devices have operated at 0.9, 1.0-1.1, or 1.55 micrometers and the important goal of obtaining a laser/amplifier in the major telecommunications channel at 1.3 micrometers has remained elusive. Prior to the invention disclosed here, the glass fiber laser operating closest to this important transmission band emitted at 1.4 micrometers for $Nd^{3+}$-doped silica as discussed by H. Po, F. Hakimi, R. J. Mansfield, R. P. Tumminelli, B. C. McCollum, E. Snitzer in their article: "Neodymium fiber lasers at 0.905, 1.06 and 1.4 micrometers," Abstracts of Annual Meeting of Optical Society of America, paper FD4, P103 (1986). Other reports of $Nd^{3+}$-doped glass lasers in the 1.3-1.4 micrometers region have been for bulk lasers of borate glasses with operating wavelengths ranging from 1.35 to 1.40 micrometers.

SUMMARY OF THE INVENTION

In accordance with one aspect of the present invention, a new and improved system having an active medium comprises a fluoride glass containing $NdF_3$. The laser system has a laser emission as a result of a transition from an electronic state $^4F_{3/2}$ of $Nd^{3+}$ to an electronic state $^4I_{13/2}$ of $Nd^{3+}$.

In accordance with another aspect of the present invention, a new and improved laser amplifier system having an active medium comprises a fluoride glass containing $NdF_3$. The laser amplifier system amplifies at a wavelength as a result of a transition from an electronic state $^4F_{3/2}$ of $Nd^{3+}$ to an electronic state $^4I_{13/2}$ of $Nd^{3+}$.

In accordance with another aspect of the present invention, a new and improved fiber laser system having an active medium comprises a core glass having an index of refraction and having a composition consisting essentially of a fluoride glass containing $NdF_3$ and a cladding glass having a composition consisting essentially of a fluoride glass having an index of refraction less than the core glass index of refraction. The fiber laser system has a laser emission as a result of a transition from an electronic state $^4F_{3/2}$ of $Nd^{3+}$ to an electronic state $^4I_{13/2}$ of $Nd^{3+}$.

In accordance with another aspect of the present invention, a new and improved fiber amplifier systems having an active medium comprises a core glass having an index of refraction and having a composition consisting essentially of a fluoride glass containing $NdF_3$ and a cladding glass having a composition consisting essentially of a fluoride glass having an index of refraction less than the core glass index of refraction. The fiber amplifier system amplifies at a wavelength as a result of a transition from an electronic state $^4F_{3/2}$ of $Nd^{3+}$ to an electronic state $^4I_{13/2}$ of $Nd^{3+}$.

Figure 1:
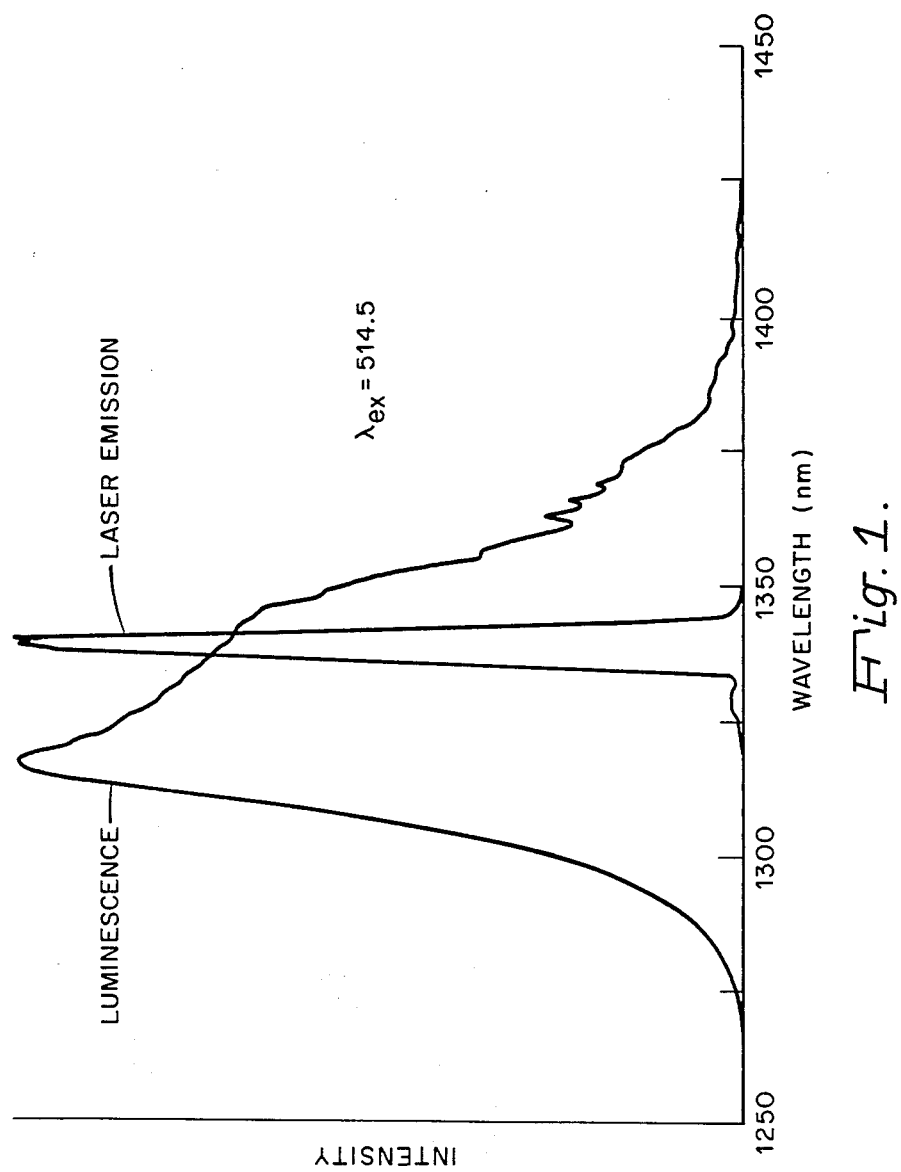
FIG. 1 is a curve of the comparison of the luminescence spectrum and laser emission for a $Nd^{3+}$-doped fluorozirconate heavy metal fluoride glass free-running (i.e., untuned) fiber laser operated well above threshold in accordance with the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

There are fundamental reasons behind the difficulty in obtaining gain near 1.3 micrometers for $Nd^{3+}$-doped glasses, particularly silicates, that are rooted in the ion-host interaction. Alcock et al. have observed pump-induced loss rather than gain at 1.32 and 1.34 micrometers in a $Nd^{3+}$-doped silica fiber. Only at 1.4 micrometers has significant gain been reported for this glass system. The $^4F_{3/2} \rightarrow ^4I_{13/2}$ transition is responsible for the luminescence and any gain that may be observed in the 1.3-1.4 micrometers spectral region. However, there is a competing $^4F_{3/2} \rightarrow ^4G_{7/2}$ excited state absorption (ESA) transition in the same region. Conditions of net gain or loss at a particular wavelength will depend both upon the spectral overlap between these competing transitions and their respective intensities. In our search for a suitable $Nd^{3+}$ host for a 1.3 micrometers laser, we have calculated the ratio of the linestrength of the emitting transition to that of the ESA transition for several glasses. This analysis serves as a useful initial screening technique for potential gain media, but it cannot be used to predict whether a given $Nd^{3+}$-doped glass will exhibit gain at the desired wavelengths. The ratio was found to be 0.92 for silica, placing it among the least favorable hosts for gain at 1.3 micrometers. In contrast, fluorozirconate glasses have a ratio of 2.0 and offer more favorable conditions. Measurements of the luminescence emission spectrum for several $Nd^{3+}$-doped glasses were also performed since the emission spectrum reveals the spectral dependence of the stimulated emission cross section. In this respect as well fluorozirconate and fluoride glasses generally were found to be superior to silica-based glasses since the predicted peak of their gain as a function of wavelength lies closer to 1.3 micrometer. Because of the greater potential in the fluorozirconate system and relatively well established fiber fabrication technology for this glass, we undertook and successfully demonstrated $Nd^{3+}$-doped fluorozirconate fiber laser near 1.3 micrometers. In addition, other fluoride glass formulations doped with $Nd^{3+}$ which can be used include, but are not limited to, the following examples:

BIZYT
  30 $BaF_2$, 30 $InF_3$, 20 $ZnF_2$, 10 $YbF_3$, 10 $ThF_4$

BZYTL
  19 $BaF_2$, 27 $ZnF_2$, 5 $YbF_3$, 27 $ThF_4$, 22 $LuF_3$

Fluoroaluminate
  30.2 $AlF_3$, 10.2 $ZrF_4$, 8.3 $YF_3$, 3.5 $MgF_2$
  18.0 $CaF_2$, 11.7 $SrF_2$, 9.3 $BaF_2$, 5.0 $PbF_2$, 3.8 NaF CLAP
  29 $CdF_2$, 9 LiF, 34 $AlF_3$, 28 $PbF_2$ Fluoroberyllate
  70.0 $BeF_2$, 30 NaF

FIBER SYNTHESIS

The fiber used was synthesized by a rotational casting technique (see: D. C. Tran, C. F. Fisher, and G. H. Sigel, Jr., "Fluoride glass preforms prepared by a rotational casting process," Electronics Letters 18, 657–658 (1982).) utilizing high purity raw materials. The components for the core and cladding glasses were stored in argon. Extreme care was required in purifying, handling, and processing the raw materials and glass because trace impurities, including oxygen and water, significantly degrade the transmission and strength of the fiber.

The composition of the core glass was as follows: 52.8 mole % $ZrF_4$, 19.9 mole % $BaF_2$, 2.5 mole % $LaF_3$, 3.0 mole % $AlF_3$, 19.9 mole % NaF, 0.4 mole % $InF_3$, and 1.5 mole % $NdF_3$, the active dopant. The composition of the cladding glass was as follows: 39.6 mole % $ZrF_4$, 17.9 mole % $BaF_2$, 4.0 mole % $LaF_3$, 3.0 mole % $AlF_3$, 21.9 mole % NaF, 0.4 mole % $InF_3$, and 13.2 mole % $HfF_4$. The $HfF_4$ was substituted for a fraction of the $ZrF_4$ in the cladding glass to reduce the index of refraction, thereby forming an optical waveguide. The particular concentration of $NdF_3$ used was decided upon because of the high losses these fibers exhibited due to large particle scattering. Shorter fiber lengths and higher dopant concentrations were used to reduce the losses and to increase the probability of obtaining laser action. Too high a dopant concentration, however, would result in a concentration quenching and a reduced fluorescence efficiency. In the absence of detailed measurements, a $NdF_3$ concentration of about 1.5 mole % was used as the best trade-off between these conflicting requirements. For lower loss fiber the optimum design would use a lower $Nd^{3+}$ concentration and a longer fiber length.

The raw materials were processed into fiber using standard procedures documented in the literature. The core and cladding materials were individually batch melted. The cladding melt was poured into a rotational caster which was spun to solidify the glass as a tube. The core glass was then poured into the cladding tube where it solidified to form a core/clad preform rod. The preform was then drawn into fiber and coated with a UV-cured epoxy acrylate.

The resultant $Nd^{3+}$-doped fiber was optically characterized. The losses were quite high: 10,000 dB/km at 1.0 micrometers, and 8,000 dB/km at 1.3 micrometers. Most of the laser experiments were performed on short sections (2–3 cm) of fiber epoxied into glass capillary tubes and mechanically polished at both ends. Some samples were also prepared by the conventional technique of stripping the coating and cleaving the fiber.

LASER DEMONSTRATIONS

Polished or cleaved fiber ends were butted against dielectric mirrors using the technique pulished by Mears et al. An Ar ion laser pump at 514.5 nm was focused through one of the resonator mirrors by a 10× microscope objective. The absorption coefficient of the core glass at the pump wavelength was 0.792 $cm^{-1}$ or 344 dB/m. The mirror reflectivities used ranged from 98% to 99.5% at the emission wavelengths, with transmission from 60% to 90% at the pump wavelength. The short pump absorption lengths and high thresholds resulting from the use of multimode fiber led to deleterious thermal effects. These were reduced by mechanically chopping the pump beam with a 0.1 duty factor. The duration of the pumping interval was kept more than 10 times greater than the $Nd^{3+}$ spontaneous emission lifetime (approximately 0.4 ms) to insure steady-state conditions were achieved.

Figure 2:
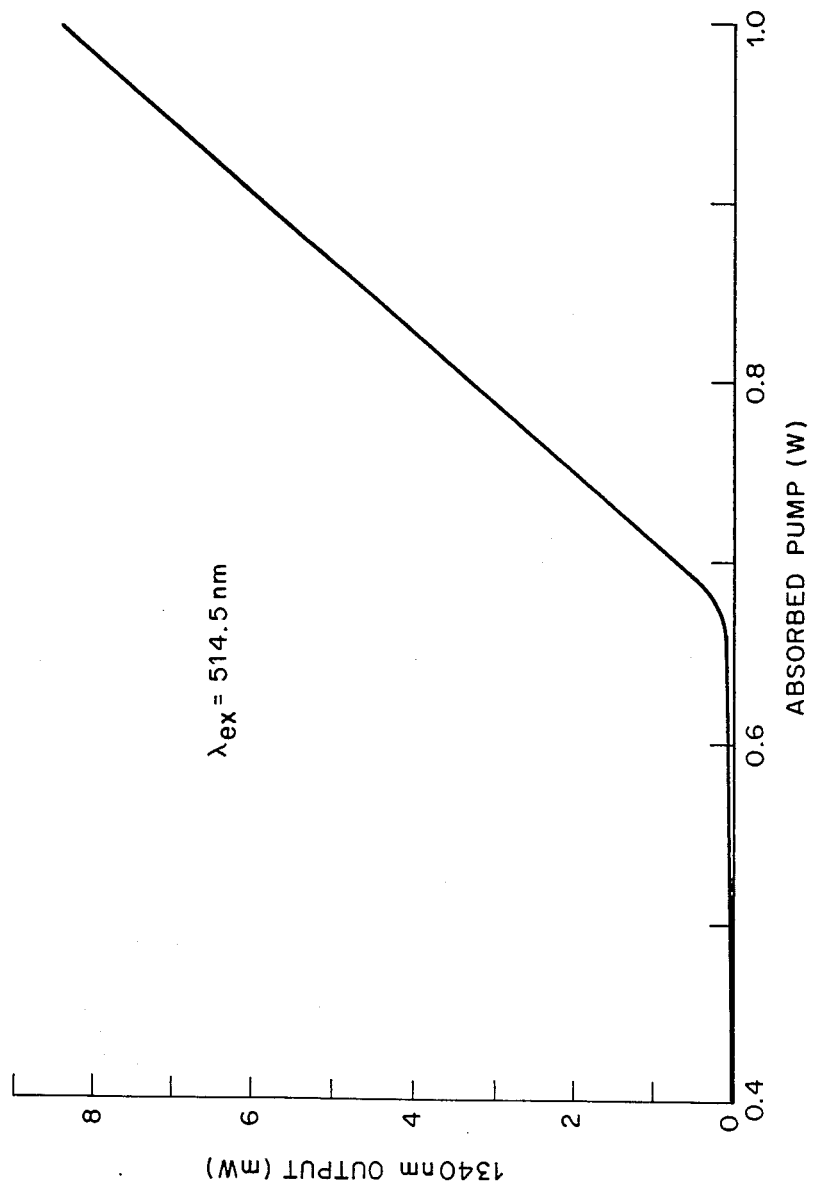
FIG. 2 is a curve of the output power of 1.3 micrometers $Nd^{3+}$-doped fluorozirconate heavy metal fluoride glass multimode fiber laser as a function of 514.5 nm pump power absorbed in accordance with the present invention.

To obtain laser action at approximately 1.3 micrometers, resonator mirrors were used which provided high reflectivity over the range 1.3–1.4 micrometers and low reflectivity (50%) at 1 micrometers. The latter condition is necessary to suppress laser oscillation on the stronger $^4F_{3/2} \rightarrow {}^4I_{11/2}$ transition. The figures illustrate the characteristics of a fiber sample 2.83 cm long with a core diameter of 51 micrometers. FIG. 1 compares the luminescence and laser emission spectra for excitation conditions well above threshold. Significantly, the laser emission at threshold is at 1.33 micrometers, well past the luminescence and stimulated emission peak at 1.32 micrometers. This indicates that a loss mechanism such as ESA has significantly reduced the net gain for $\lambda < 1.33$ micrometers. The free-running laser exhibits bimodal behavior: As the excitation is increased above threshold the laser output intensity is transferred from a peak at 1.33 micrometers to one at 1.34 micrometers. The former is still visible in FIG. 1 as the small peak to the left of the main laser emission peak. Just above threshold, laser emission was observed at wavelengths as short as 1.325 micrometers, indicating the possibility of obtaining useful gain at wavelengths equal to or greater than 1.32 micrometers. The power output as a function of pump power input for the 1.3 micrometers laser is illustrated in FIG. 2. The threshold for mirrors with 98.2% reflectivity at 1.33 micrometers was 670 mW and the slope efficiency was found to be 2.6%. Output powers exceeding 10 mW were achieved for this laser.

POTENTIAL APPLICATIONS

Among the most promising applications for doped optical fibers exhibiting gain are laser oscillators and amplifiers. The latter could have a profound effect upon the cost and performance of wideband transmission systems. The impact of fiber amplifiers on subscriber loops and local area networks could be even more important, not only providing an inexpensive high performance route to overcoming splitting losses, but also changing the approaches to system architectures and topologies. The performance of the laser discussed above was not optimized. If this were done and standard design singlemode telecommunications fiber excited by a 0.8 micrometer diode laser were used, the lasing threshold is expected to be reduced to a few milliwatts.

The importance of optical amplifiers in fiber optic networks is widely recognized. A high efficiency pump power to signal power conversion has been demonstrated for a single mode $Er^{3+}$-doped silica glass fiber amplifier at 1.5 micrometers. For example a schematic of a fiber amplifier can be found in the following reference which is incorporated by reference: R. J. Mears, L. Reekie, I. M. Jauncey, and D. N. Payne, "High-gain rare-earth-doped fiber amplifier at 1.54 μm," Technical Digest OFC/IOOC '87, paper WI2. A fluoride fiber amplified based upon the laser described above would perform the same function at the 1.3 micrometer telecommunications band.

Other potential applications of fiber lasers and amplifiers at this wavelength are the areas of sensor and medical technology.

The conditions used for this laser demonstration are similar to those required for bulk lasers, and verify that large pieces of $Nd^{3+}$-doped fluoride glasses can also be used to make bulk lasers and amplifiers pumped by lasers or lamps.

While there has been shown and described what is at present considered the preferred embodiment of the invention, it will be obvious to those skilled in the art that various changes and modifications may be made therein without departing from the scope of the invention as defined by the appended claims.

What is claimed is:

1. A laser system having an active medium comprising a fluoride glass containing $NdF_3$, said laser system having a laser emission as a result of a transition from an electronic state $^4F_{3/2}$ of $Nd^{3+}$ to an electronic state $^4I_{13/2}$ of $Nd^{3+}$.

2. A laser in accordance with claim 1 wherein said laser emission is equal to or greater than 1.32 micrometers.

3. A laser in accordance with claim 1 wherein said fluoride glass comprises a cation of a metal selected from the group consisting of zirconium, hafnium, zinc, beryllium, barium, aluminum, cadmium, and combinations thereof.

4. A laser in accordance with claim 1 wherein said laser is a bulk laser.

5. A laser amplifier system having an active medium comprising a fluoride glass containing $NdF_3$, said laser amplifier system amplifying at a wavelength as a result of a transition from an electronic state $^4F_{3/2}$ of $Nd^{3+}$ to an electronic state $^4I_{13/2}$ of $Nd^{3+}$.

6. A laser amplifier in accordance with claim 5 wherein said wavelength is equal to or greater than 1.32 micrometers.

7. A laser amplifier in accordance with claim 5 wherein said fluoride glass comprises a cation of a metal selected from the group consisting of zirconium, hafnium, zinc, beryllium, barium, aluminum, cadmium, and combinations thereof.

8. A laser amplifier in accordance with claim 5 wherein said laser amplifier is a bulk laser amplifier.

9. A fiber laser system having an active medium comprising a core glass having an index of refraction and having a composition consisting essentially of a fluoride glass containing $NdF_3$ and a cladding glass having a composition consisting essentially of a fluoride glass having an index of refraction less than said core glass index of refraction, said fiber laser system having a laser emission as a result of a transition from an electronic state $^4F_{3/2}$ of $Nd^{3+}$ to an electronic state $^4I_{13/2}$ of $Nd^{3+}$.

10. A fiber laser in accordance with claim 9 wherein said laser emission is equal to or greater than 1.32 micrometer.

11. A fiber laser in accordance with claim 9 wherein said composition of said core glass consists essentially of 52.8 mole % $ZrF_4$, 19.9 mole % $BaF_2$, 2.5 mole % $LaF_3$, 3.0 mole % $AlF_3$, 19.9 mole % NaF, 0.4 mole % $InF_3$, and 1.5 mole % $NdF_3$ and a cladding glass composition consisting essentially of 39.6 mole % $ZrF_4$, 17.9 mole % $BaF_2$, 4.0 mole % $LaF_3$, 3.0 mole % $AlF_3$, 21.9 mole % NaF, 0.4 mole % $InF_3$, and 13.2 mole % $HfF_4$; said glass fiber being adapted to lase having a laser emission equal to or greater than 1.32 micrometers.

12. A fiber laser in accordance with claim 9 wherein said fluoride glass of said core glass and said cladding glass comprises a cation of a metal selected from the group consisting of zirconium, hafnium, zinc, beryllium, barium, aluminum, cadmium, and combinations thereof.

13. A fiber amplifier system having an active medium comprising a core glass having an index of refraction and having a composition consisting essentially of a fluoride glass containing $NdF_3$ and a cladding glass having a composition consisting essentially of a fluoride glass having an index of refraction less than said core glass index of refraction; said fiber amplifier system amplifying at a wavelength as a result of a transition from an electronic state $^4F_{3/2}$ of $Nd^{3+}$ to an electronic state $^4I_{13/2}$ of $Nd^{3+}$.

14. A fiber amplifier in accordance with claim 13 wherein said wavelength is equal to or greater than 1.32 micrometer.

15. A fiber amplifier in accordance with claim 13 wherein said composition of said core glass consists essentially of 52.8 mole % $ZrF_4$, 19.9 mole % $BaF_2$, 2.5 mole % $LaF_3$, 3.0 mole % $AlF_3$, 19.9 mole % NaF, 0.4 mole % $InF_3$, and 1.5 mole % $NdF_3$ and a cladding glass composition consisting essentially of 39.6 mole % $ZrF_4$, 17.9 mole % $BaF_2$, 4.0 mole % $LaF_3$, 3.0 mole % $AlF_3$, 21.9 mole % NaF, 0.4 mole % $InF_3$, and 13.2 mole % $HfF_4$; said glass fiber amplifier being adapted to amplify at a wavelength equal to or greater than 1.32 micrometers.

16. A fiber amplifier in accordance with claim 13 wherein said fluoride glass of said core glass and said cladding glass comprises a cation of a metal selected from the group consisting of zirconium, hafnium, zinc, beryllium, barium, aluminum, cadmium, and combinations thereof.

* * * * *